(No Model.) 2 Sheets—Sheet 1.
H. GOERING.
STEAM GENERATOR.
No. 480,719. Patented Aug. 16, 1892.
FIG=1-
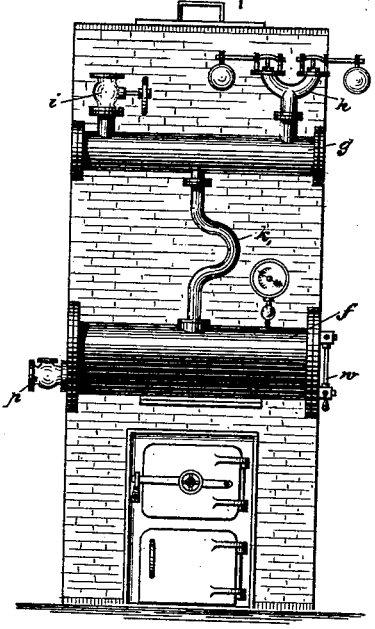
FIG=2-
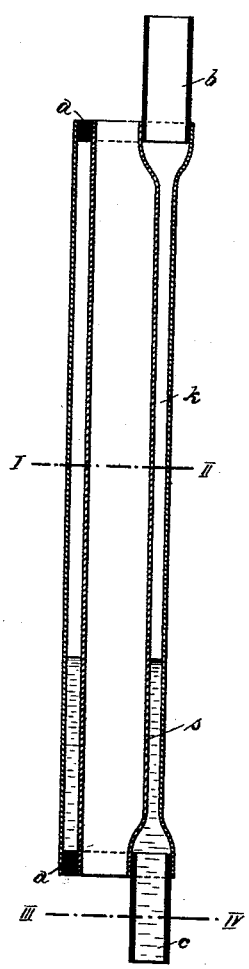
FIG=3-
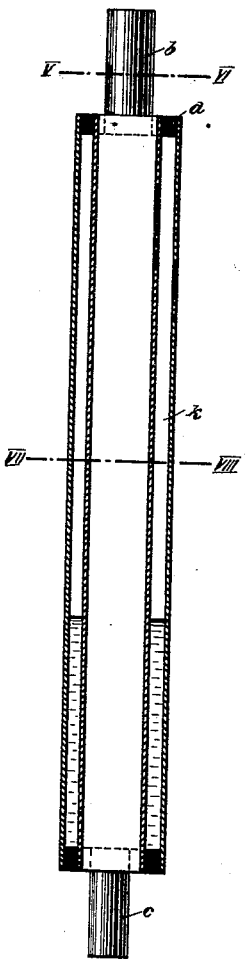
FIG=4-
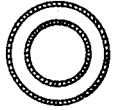
FIG=5-
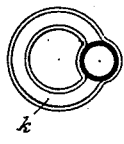
FIG=6-
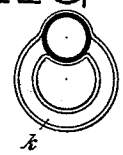
Witnesses:
Theodor Staudel.
Willy Eckert.
Inventor:
Hermann Goering
per Gerson and Sachse
his Attorneys.

(No Model.) 2 Sheets—Sheet 2.
H. GOERING.
STEAM GENERATOR.
No. 480,719. Patented Aug. 16, 1892.
FIG=7-
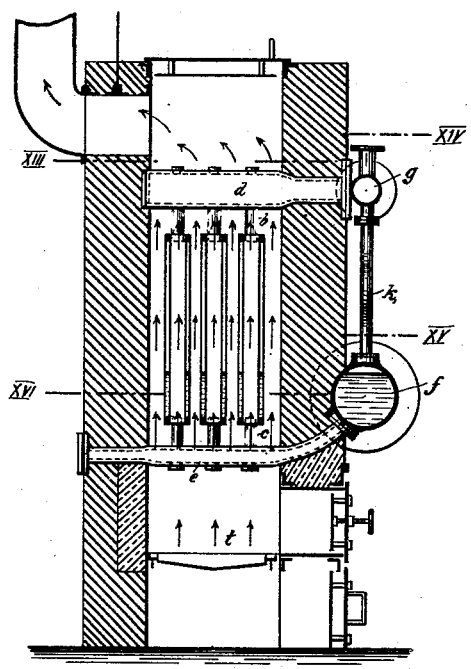
FIG=8-
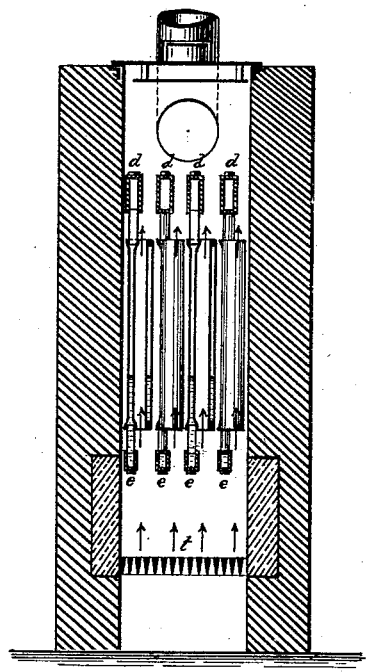
FIG=9-
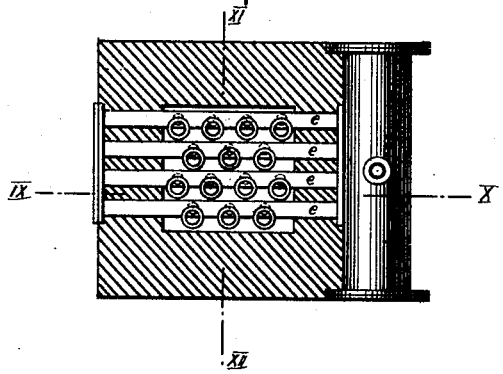
FIG=10-
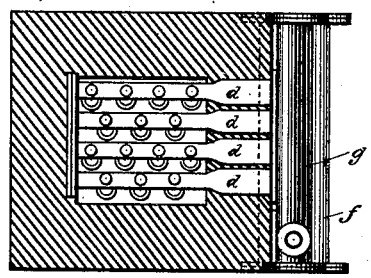

UNITED STATES PATENT OFFICE.

HERMANN GOERING, OF BIRKENFELD-ON-THE-NAHE, GERMANY.

STEAM-GENERATOR.

SPECIFICATION forming part of Letters Patent No. 480,719, dated August 16, 1892.

Application filed January 20, 1892. Serial No. 418,677. (No model.)

*To all whom it may concern:*

Be it known that I, HERMANN GOERING, a subject of the Emperor of Germany, and a resident of Birkenfeld-on-the-Nahe, in the Empire of Germany, have invented a new and useful Steam-Generator with Boilers of Annular Cross-Section, of which the following is a specification.

The object of this invention is a system of tubes or pipes shifted into each other, which are arranged above the fire-space of a steam-generator and with which the water to be evaporated is located between the sides of the pipes shifted into each other.

The improved arrangement has for its purpose to allow of a highly-dry steam with most favorable utilization of the fuel.

In the herein-annexed drawings, Figure 1 is a front view of the generator. Figs. 2 and 6 are detail views of the boilers, Figs. 2 and 3 being longitudinal sections of the boilers, Fig. 4 being a cross-section on the lines I II, Fig. 2, and VII VIII, Fig. 3, Fig. 5 being a cross-section on the line III IV, Fig. 3, and Fig. 6 being a cross-section on the line V VI, Fig. 3. Fig. 7 is a vertical and longitudinal section of the generator on the line IX X, Fig. 9; Fig. 8, a vertical and cross-section on the line XI XII, Fig. 9; Figs. 9 and 10, horizontal sections on the lines XIII XIV and XV XVI, Fig. 7, respectively.

The steam-generator consists of vertical boilers, each of which is composed of two tubes of different diameter, which are shifted concentrically into each other, so that an interstice remains. For closing the latter against the heating-space and for centering the tubes rings $a$ $a$ of the thickness of the interstice are so soldered in with brass at top and bottom as to leave openings of cylindric cross-section. Into these openings are placed and soldered sleeves C and $c$, which serve to place the interstice K in connection with the cast-iron horizontal tubes $d$ or $e$. The latter have a quadrangular cross-section, the lower ones terminating in the water-reservoir $f$ and the upper in the steam-accumulator $g$. The closing may be effected by flanges. The steam-accumulator $g$, on which are provided the safety-valve $h$ and the steam-supply valve $i$, is in connection through a tube with the water-reservoir $f$, having the feeding-valve $p$. The water-reservoir is provided with the water-gage $w$.

By the described arrangement the purpose is attained of placing all tubes or receptacles in question $c$, $d$, $e$, $f$, $g$, and $k$ in connection with each other.

When the water-reservoir $f$ is filled to the normal water-level, the water reaches in the cylindric annular boilers $s$ up to about one-fourth of their height, and can be without trouble constantly maintained at that height. The heating is effected from the furnace $t$, the boilers being surrounded inside and outside with the heating gases. Owing to the boiling-tubes being never filled for more than one-fourth of their height with water, the purpose is accomplished that the steam-bubbles forming on the surface of the water are destroyed by further supply of heat. Higher up superheating of the steam takes place, so that the finished steam formed escapes in an absolutely-dry state. The quantity of water to be heated being very small, a very rapid heating is rendered possible. The connecting-tube $k$ serves to compensate the pressure in the water-reservoir and in the steam-accumulator.

What I claim is—

In a steam-generator, the combination of concentric tubes united at the ends by rings $a$ with sleeves $b$ and $c$, the horizontal tubes $d$ $e$, the steam-accumulator $g$, the tube $k$, the water-reservoir $f$, and the feeding-valve $p$, as and for the purpose set forth.

HERMANN GOERING.

Witnesses:
 L. MEECHER,
 CARL ED. HAHN.